April 23, 1935. J. S. MANTON 1,998,512
BICYCLE LOCK
Filed Dec. 30, 1933
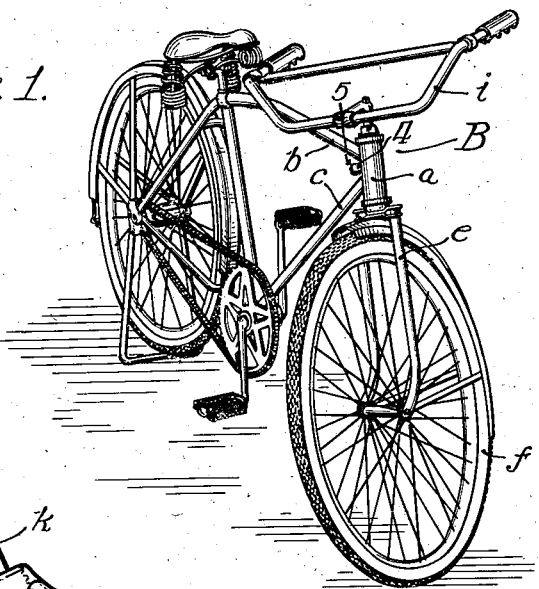
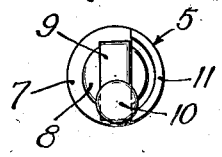
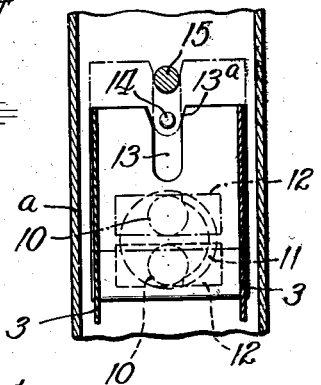
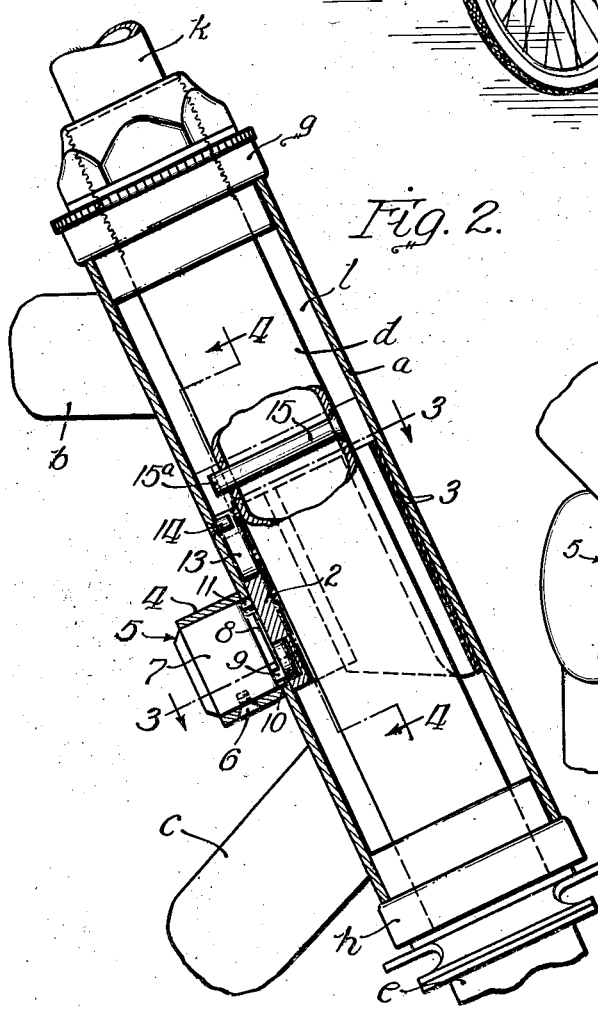
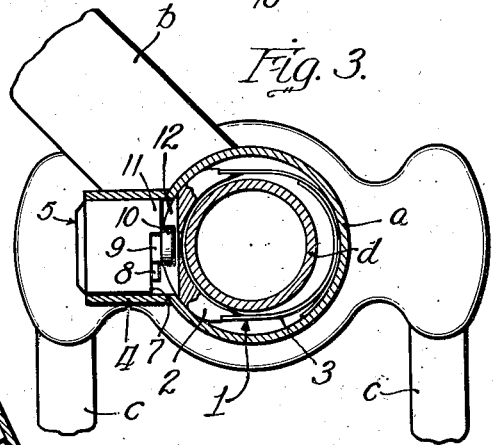
Inventor:
James S. Manton
By: Brown, Jackson, Boettcher & Dienner,
Attys.

Patented Apr. 23, 1935

1,998,512

UNITED STATES PATENT OFFICE 1,998,512

BICYCLE LOCK

James S. Manton, Oak Park, Ill.

Application December 30, 1933, Serial No. 704,670

5 Claims. (Cl. 70—90)

This invention relates to locking means, and has to do more particularly with locking means suitable for use with bicycles and like structures.

One of the main objects of my invention is to provide locking means of simple and inexpensive construction which can be applied to bicycles of known construction at small cost. A further object is to provide means of the character stated associated with the head of the frame of the bicycle in such manner that space within this head, at present unutilized, is employed for housing part of the locking mechanism. A further object is to provide locking means of the character stated which, when applied to the head of a bicycle frame, avoids unsightly projections and presents a neat and attractive appearance. Further objects and advantages of my invention will appear from the detail description.

In the drawing:—

Figure 1 is a perspective view of a bicycle with locking means in accordance with my invention applied thereto;

Figure 2 is a vertical sectional view, on an enlarged scale, through the head of the bicycle frame and associated parts, embodying the locking means of my invention, parts being shown in elevation and parts being broken away;

Figure 3 is a section taken substantially on line 3—3 of Figure 2, parts being shown in elevation;

Figure 4 is a section taken substantially on line 4—4 of Figure 2;

Figure 5 is an inner end view of the cylinder lock.

I have disclosed the locking device of my invention, by way of illustration, as applied to a bicycle B of known construction having a frame comprising a tubular head $a$, and an upper horizontal bar $b$ and a reach bar $c$, rigidly secured to the head in a known manner. Head $a$ receives stem $d$ of a fork $e$ within which is suitably mounted front wheel $f$ of the bicycle. Stem $d$ is mounted to turn in bearing structures $g$ and $h$ of known type mounted in the upper and lower ends, respectively, of head $a$ in a known manner. A handle bar $i$ is disposed at the upper end of head $a$ and has a depending shank $k$ suitably secured to stem $d$ in a known manner, for steering purposes. Stem $d$ of fork $e$ is disposed in concentric spaced relation to head $a$, leaving within the head a space $l$ of appreciable width extending about the stem. The bicycle so far described is of known construction and the space $l$ within the head $a$ is ordinarily not utilized for any useful purpose, this space being due to the mounting of the stem $d$ in the bearing structures $g$ and $h$, which is the common practice in constructing bicycles of known type.

In applying the locking means of my invention to a bicycle, I utilize the space $l$ for housing a locking member 1 in the form of a tubular structure which extends around stem $d$ and is slidable lengthwise of head $a$. This member 1 comprises a rectangular metal block 2 which is rabbitted at each end for reception of the end portion of a relatively thin arm 3 formed of spring metal, which arms are disposed in overlapping relation and contact the inner surface of head $a$ at the side thereof opposite to block 2. The outer face of block 2 is rounded to fit snugly the inner surface of head $a$, against which the block is held by the resilient arms 3. These arms are brazed or welded, or otherwise suitably secured to the sides of the block. The locking member 1 is thus held snugly within head $a$ for sliding movement lengthwise thereof while also being held against objectionable looseness or play within the head. Preferably, the arms 3 increase in width from block 2 so as to provide a relatively long bearing surface at the opposite side of head $a$, and the arms extend downward a considerable distance below block 2, at this side of the head, so as to prevent tilting of the block and movement of the lower end thereof away from the inner surface of the head. This will be clear from Figure 2, in which the lower edge of one of the arms 3 is shown as inclined downward away from block 2.

A cylindrical collar 4 is brazed or otherwise suitably secured to head $a$ and extends radially therefrom, the interior of this collar being in register with a corresponding opening through the head into the space $l$. A cylinder lock 5, of the pin type and of known construction, is mounted in collar 4 and secured therein in a suitable manner, as by means of a blind screw 6. This lock comprises a cylindrical barrel or casing 7 within which a cylinder 8 is mounted for rotation, this cylinder normally being locked against rotation by pins which can be released by insertion of a proper key into the cylinder. A metal bar 9 is suitably secured in the inner end of cylinder 8 diametrically thereof, and a disc 10 is secured to this bar at one end thereof and eccentric to the cylinder. Casing or barrel 7 is provided, at its inner end, with an inwardly projecting flange 11 which extends one-half of the circumference of the barrel, and one end of bar 9 projects outwardly beyond the periphery of cylinder 8 so as to contact flange 11 and limit turning movement of the cylinder in either direction and permit of turning of cylinder 8 through an arc of 180 degrees in either direction. While the provision of the flange 11 and bar 9 for limiting turning movement of cylinder 8 in the manner described is preferred, this is not essential, and flange 11 may be omitted if desired. The lock is of known type and need not be described in greater detail, it sufficing to note that the lock is provided with a rotatable cylinder having, at its inner end, an eccentrically mounted disc or equivalent member.

Block 2 is provided, in its outer face, with a transverse groove 12 of proper width for snugly receiving disc 10, this disc contacting the block at the top and the bottom of the groove. Block 2 is further provided with a lengthwise slot 13 extending from its upper end, the upper end portion of this slot being slightly flared at 13a, as shown in Figure 4. The inner face of disc 10 is flat and contacts the inner flat wall of groove 12 so as to hold the locking member 1 against turning movement within head a. As a further precaution against turning movement of the locking member, a pin 14 is secured in head a and projects into slot 13 in both the lowered and the raised positions of block 2, as will be clear from Figure 4 in which the raised position of the block is indicated by the dot and dash lines, the block being shown in full lines in lowered position. A pin 15 is secured through stem d of fork e and projects beyond the stem to provide a locking finger 15a. This finger is of proper diameter to enter slot 13 of block 2 when the latter is in its raised or operative position, as indicated in Figure 4. In order that finger 15a may enter slot 13 of block 2, when the block is raised into operative position, it is necessary that this finger be aligned with pin 14 lengthwise of head a. The pin 15 is so disposed that fork e is turned so as to direct the front wheel f laterally of the frame of the bicycle at a considerable angle thereto, as in Figure 1, when locking finger 15a is aligned with pin 14. With front wheel f of the bicycle disposed in this manner, the bicycle cannot be ridden straight ahead, but can be ridden in a circle only, the radius of which is determined by the angle at which the front wheel f is set.

In order to lock the bicycle, front wheel f is turned into the position shown in Figure 1, and lock 15 is then operated by means of its key so as to turn cylinder 8 through an arc of 180 degrees, thus raising the locking member 1 into operative position, at which time locking finger 15a of pin 15 is disposed within slot 13 of block 2. This effectively locks fork e against turning movement, since block 2 is held against turning movement in head a, which serves to lock the bicycle so as to prevent theft thereof. Turning of the cylinder 8 of the lock in the opposite direction returns block 2 to its normal lowered or inoperative position, in which position of the block the latter is disposed below pin 15, thus releasing stem d of fork e and permitting steering of the bicycle in the usual manner. By disposing the locking member 1 within the head a of the frame, I utilize the space l, which materially reduces the extent to which the lock 5 projects outwardly beyond head a. In this manner, I avoid having the lock projecting to an objectionable extent beyond the head of the frame, so that the locking device as a whole presents a neat and attractive appearance. A further advantage of disposing the locking member 1 within the head a is that this locking member is effectively housed and protected by the head. The extent to which locking finger 15a' projects beyond stem d of the fork e is slightly less than the distance between stem d and the inner face of the inner one of the overlapping end portions of the arms 3. This permits of removal and replacement of stem d without disturbing the locking member 1, when this locking member is in its lowered or inoperative position, which facilitates assembling and disassembling of the head and fork and handle bar structure. It will be noted, however, that the stem d cannot be withdrawn from head a when the locking member 1 is in its raised or operative position, since, at this time, stem d is held against turning movement and finger 15a of pin 15 cannot be brought into position to pass between arms 3 of member 1 and stem d in the withdrawal of the latter.

The locking device of my invention is particularly suitable for use with bicycles and like structures, as above pointed out. I do not limit my invention to this single use, however, since it is well adapted for many other purposes, and is particularly suitable for use in connection with a tubular head or casing and a stem or equivalent member mounted for turning movement within the head or casing and spaced therefrom. It will also be understood, by those skilled in the art, that changes in construction and arrangement of parts of my invention may be resorted to without departing from the field and scope of the same, and I intend to include all such variations, as fall within the scope of the appended claims, in this application in which the preferred form only of my invention is disclosed.

What I claim is:—

1. In combination in locking means of the character described, a bicycle comprising a frame having a fixed tubular head, a wheel fork having a stem extending into the head in concentric spaced relation thereto and mounted for turning movement, a tubular locking member disposed within the space between said stem and said head and slidable lengthwise of the latter into operative position and inoperative position, said member comprising a relatively thick block and resilient arms extending therefrom and bearing against the inner surface of the head opposite to the block for holding the latter against the head, said block having a slot extending from its upper end, a pin secured in the head and extending into said slot, a pin secured to the fork stem and projecting therefrom for engagement into the slot of the block when the latter is raised and the two pins are aligned lengthwise of said head, a key controlled lock mounted on the head, and operating connections between said lock and the block for raising and lowering the latter and locking it in adjustment.

2. In combination in locking means of the character described, a bicycle comprising a frame having a fixed tubular head, a wheel fork having a stem extending into the head in concentric spaced relation thereto and mounted for turning movement, a tubular locking member disposed within the space between said stem and said head and slidable lengthwise of the latter into operative position and inoperative position, said member being slotted from its upper end and held against turning movement relative to the head, a pin secured to and projecting from said stem and engageable into said slot in the raised position of said locking member, a key controlled lock mounted on the head, and operating connections between said lock and said locking member for raising and lowering the latter and locking it in adjustment.

3. In combination in locking means of the character described, a bicycle comprising a frame having a fixed tubular head, a wheel fork having a stem extending into and spaced from the head and mounted for turning movement, a locking member disposed between said stem and said head and slidable lengthwise of the latter into operative position and inoperative position, said member being slotted from one end and held against turning movement relative to the head, a locking element rigid with and projecting from said stem and engageable into said slot in the operative position of said locking member, a lock accessible exteriorly of the head, and operating connections between said lock and said locking member for moving the latter into operative position and inoperative position and locking it in adjustment.

4. In combination in locking means of the character described, a bicycle comprising a frame having a fixed tubular head, a wheel fork having a stem extending into and spaced from the head and mounted for turning movement, a locking member disposed between said stem and said head and slidable lengthwise of the latter into operative position and inoperative position, said member being slotted from one end and held against turning movement relative to the head, a locking element rigid with and projecting from said stem and engageable into said slot in the operative position of said locking member, the locking member being provided with a groove in its outer face and the head having an opening aligned with said groove, a lock casing secured to said head around said opening, a lock secured in the casing and comprising a cylinder mounted to turn on an axis substantially perpendicular to the head, and a member secured to the inner end of the cylinder eccentrically thereto and projecting into said groove for shifting the locking member lengthwise of the head upon rotation of said cylinder.

5. In combination in locking means of the character described, a bicycle comprising a frame having a fixed tubular head, a wheel fork having a stem extending into and spaced from the head and mounted for turning movement, a locking member disposed between said stem and said head and slidable lengthwise of the latter into operative position and inoperative position, said member being slotted from one end and held against turning movement relative to the head, a locking element rigid with and projecting from said stem and engageable into said slot in the operative position of said locking member, a lock accessible exteriorly of the head, said lock comprising a cylinder mounted to turn on an axis substantially perpendicular to the head, and an eccentric connection between the inner end of the cylinder and said locking member for shifting the latter lengthwise of said head upon rotation of said cylinder.

JAMES S. MANTON.